US012581537B2

(12) United States Patent
Lin et al.

(10) Patent No.: US 12,581,537 B2
(45) Date of Patent: Mar. 17, 2026

(54) CHANNEL OCCUPANCY TIME DETERMINATION METHOD, FIRST COMMUNICATION NODE AND STORAGE MEDIUM

(71) Applicant: ZTE CORPORATION, Shenzhen (CN)

(72) Inventors: Wei Lin, Shenzhen (CN); Li Tian, Shenzhen (CN); Hanqing Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 340 days.

(21) Appl. No.: 18/261,803

(22) PCT Filed: Dec. 16, 2021

(86) PCT No.: PCT/CN2021/138717
§ 371 (c)(1),
(2) Date: Jul. 17, 2023

(87) PCT Pub. No.: WO2022/151907
PCT Pub. Date: Jul. 21, 2022

(65) Prior Publication Data
US 2024/0090030 A1 Mar. 14, 2024

(30) Foreign Application Priority Data

Jan. 15, 2021 (CN) .......................... 202110056975.6

(51) Int. Cl.
*H04W 74/0816* (2024.01)
*H04W 72/12* (2023.01)
(Continued)

(52) U.S. Cl.
CPC ....... *H04W 74/0816* (2013.01); *H04W 72/12* (2013.01); *H04W 74/002* (2013.01); *H04W 74/04* (2013.01)

(58) Field of Classification Search
None
See application file for complete search history.

(56) References Cited

U.S. PATENT DOCUMENTS 12,250,723 B2 * 3/2025 He ..................... H04W 74/0866
2022/0124796 A1 * 4/2022 Salem ................... H04L 5/0051
(Continued)

FOREIGN PATENT DOCUMENTS

CN 107889114 A 4/2018
CN 110784874 A 2/2020
(Continued)

OTHER PUBLICATIONS

Extended European Search Report in Application No. 21919095.6, dated Oct. 29, 2024, 11 pages.
(Continued)

*Primary Examiner* — Anh Vu H Ly
(74) *Attorney, Agent, or Firm* — Morgan, Lewis & Bockius LLP

(57) ABSTRACT
A channel occupancy time determination method is applied to a first communication node. The method includes, in response to the first communication node initiating no channel occupancy, detecting information sent by a second communication node; and determining, according to the detection result, channel occupancy time (COT) for data transmission.

20 Claims, 1 Drawing Sheet

In response to the first communication node initiating no channel occupancy, detect information sent by a second communication node ⟩ S110

Determine COT for data transmission according to the detection result ⟩ S120

(51) Int. Cl.
    *H04W 74/00*     (2009.01)
    *H04W 74/04*     (2009.01)

(56)           References Cited

U.S. PATENT DOCUMENTS

| | | | |
|---|---|---|---|
| 2022/0159725 A1* | 5/2022 | Liu | H04W 76/14 |
| 2023/0146487 A1* | 5/2023 | Chien | H04W 74/006 |
| | | | 370/329 |

FOREIGN PATENT DOCUMENTS

| | | | |
|---|---|---|---|
| CN | 111800887 A | 10/2020 |
| CN | 112867156 A | 5/2021 |
| WO | WO 2020/066606 A2 | 4/2020 |
| WO | WO 2020/165200 A1 | 8/2020 |
| WO | WO-2021007505 A1 | 1/2021 |

OTHER PUBLICATIONS

International Search Report in Application No. PCT/CN2021/138717, dated Feb. 25, 2022, 4 pages, including translation.

* cited by examiner

CHANNEL OCCUPANCY TIME DETERMINATION METHOD, FIRST COMMUNICATION NODE AND STORAGE MEDIUM

CROSS REFERENCE TO RELATED APPLICATIONS

This is a national stage application filed under 37 U.S.C. 371 based on International Patent Application No. PCT/CN2021/138717, filed on Dec. 16, 2021, and claims priority to Chinese Patent Application No. 202110056975.6 filed on Jan. 15, 2021, the disclosures of which are incorporated herein by reference in their entireties.

TECHNICAL FIELD

The present application relates to the field of communication technology, for example, a channel occupancy time determination method and apparatus, a first communication node, and a storage medium.

BACKGROUND

An unlicensed spectrum used is required to follow regulatory policies. For example, a device must perform a clear channel assessment (CCA) before sending data on an unlicensed carrier. Only when a channel on the unlicensed carrier is detected to be idle after the CCA is performed, can the device send data on the channel.

However, under a particular condition, no valid scheme is proposed for whether a device serves as an initiating device to perform channel access to acquire channel occupancy time (COT) for data transmission or serves as a responding device to share COT for data transmission.

SUMMARY

The present application provides a channel occupancy time determination method and apparatus, a first communication node, and a storage medium, effectively determining COT for data transmission.

An embodiment of the present application provides a channel occupancy time determination method. The method is applied to a first communication node. The method includes, in response to the first communication node initiating no channel occupancy, detecting information sent by a second communication node; and determining, according to the detection result, COT for data transmission.

An embodiment of the present application provides a channel occupancy time determination apparatus. The apparatus is configured in a first communication node. The apparatus includes a detection module configured to, in response to the first communication node initiating no channel occupancy, detect information sent by a second communication node; and a determination module configured to determine, according to the detection result, COT for data transmission.

An embodiment of the present application provides a first communication node. The first communication node includes at least one processor and a storage apparatus configured to store at least one program. When the at least one program is executed by the at least one processor, the at least one processor performs the preceding method.

An embodiment of the present application provides a storage medium storing a computer program which, when executed by a processor, causes the processor to perform the preceding method.

DETAILED DESCRIPTION

To illustrate the object, solutions and advantages of the present application clearer, embodiments of the present application are described hereinafter in detail in conjunction with the drawings. It is to be noted that if not in collision, the embodiments of the present application and features therein may be combined with each other in any manner.

The steps illustrated in the flowcharts among the drawings may be performed by a computer system such as a set of computer-executable instructions. Although logical sequences are illustrated in the flowcharts, in some cases, the illustrated or described steps may be performed in sequences different from the sequences described herein.

Formulation of standards of the first phase of New Radio for the fifth-generation mobile communication technology (5G NR) has been completed. From the perspective of standard formulation and technical development trends, a 5G system is dedicated to research on a higher rate, massive links, ultra-low latency, higher reliability, energy efficiency improvement by a factor of 100, and other technical indicators to support new demand changes. The NR-based access to unlicensed spectrum (NR-U) technology has great application prospects in the Internet of Things, factory automation, and other aspects. However, the NR-U technology still faces many problems to be solved.

An unlicensed spectrum used is required to follow regulatory policies. For example, a device must perform a CCA (also called listen-before-talk (LBT)) before sending data on an unlicensed carrier. Only when a channel on the unlicensed carrier is detected to be idle after the CCA is performed, can the device send data on the channel. The frame-based equipment (FBE) mode has three main parameters: a fixed frame period (FFP), channel occupancy time (COT), and an idle period. The FFP consists of the COT and the idle period. The start position of the COT is aligned with the start position of the FFP. The end position of the idle period is aligned with the end position of the FFP. The process of initiating channel occupancy by an FBE is as follows: The FBE performs a CCA detection in the idle period adjacent to the FFP. If the current channel is detected by the CCA to be idle, the FBE can acquire the usage right of COT of the FFP and can start data transmission from the start symbol of the FFP. If the current channel is detected by the CCA to be busy, the FBE cannot transmit data by using the start symbol of the FFP. The FBE mode may also be referred to as a semi-static channel access mode. The channel access process period of the semi-static channel access mode and the FFP are different expressions of the same parameter.

Both a user equipment (UE) and a base station can serve as an initiating device to initiate channel occupancy. No valid rule is set for under what conditions a UE is required to share COT of a base station or is required to initiate channel occupancy.

Figure 1:
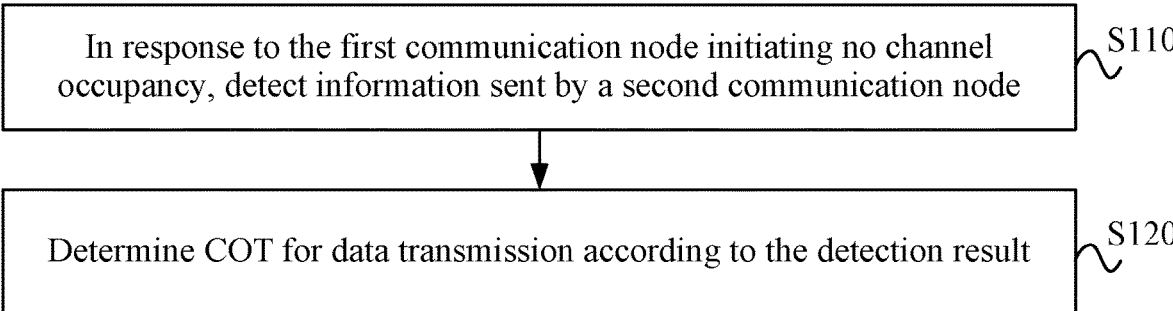
FIG. 1 is a flowchart of a channel occupancy time determination method according to an embodiment of the present application.

In an example embodiment, FIG. 1 is a flowchart of a channel occupancy time determination method according to an embodiment of the present application. The method may be used for determining COT for data transmission. The method may be performed by a channel occupancy time determination apparatus. The apparatus may be performed by software and/or hardware and integrated in a first communication node. The first communication node may be a node able to communicate with a second communication node. For example, the first communication node may be a UE, and the second communication node may be a base station.

As shown in FIG. 1, the channel occupancy time determination method of the present application includes S110 and S120.

In S110, in response to the first communication node initiating no channel occupancy, information sent by a second communication node is detected.

In this embodiment, the first communication node may determine COT for data transmission by detecting information sent by a second communication node. The detected information may be unicast traffic data, group control signaling, or control signaling. The unicast traffic data includes at least one of the following: physical uplink shared channel data; physical downlink shared channel data; physical uplink control channel data; or physical downlink control channel data. The group control signaling may be control information sent by one device to a device group. The control signaling may be control information sent by one device to another device.

In S120, COT for data transmission is determined according to the detection result.

After detecting data sent by the second communication node, this step may determine COT for data transmission according to the detection result. The detection result may be that the information sent by the second communication node includes unicast traffic data, group control signaling, or control signaling.

Different detection results may determine different COTs for data transmission. This is not limited here.

In an embodiment, when the detection result is that the information sent by the second communication node includes unicast traffic data, the first communication node may share COT of the second communication node to perform data transmission.

In an embodiment, when the information sent by the second communication node includes group control signaling, the first communication node may share COT of the second communication node to perform data transmission.

In an embodiment, when the information sent by the second communication node includes group control signaling, the first communication node may determine, according to the content indicated by the group control signaling, COT for data transmission.

In an embodiment, when the information sent by the second communication node includes group control signaling, but the first communication node omits detecting the group control signaling, the first communication node does not share channel occupancy initiated by the second communication node to perform data transmission; or when detecting unicast traffic data sent by the second communication node, the first communication node shares COT corresponding to channel occupancy initiated by the second communication node; or it is determined whether the first communication node satisfies a channel occupancy initiation condition to determine COT for data transmission.

The channel occupancy time determination method of the present application includes, in response to the first communication node initiating no channel occupancy, detecting information sent by a second communication node; and determining, according to the detection result, COT for data transmission, thereby effectively determining COT for data transmission.

Based on the previous embodiment, variant embodiments of the previous embodiment are provided. It is to be noted here that for ease of description, only differences from the previous embodiment are described in the variant embodiments.

In an embodiment, determining, according to the detection result, COT for data transmission includes, in response to the information sent by the second communication node including unicast traffic data, sharing COT corresponding to channel occupancy initiated by the second communication node to perform data transmission, where the first communication node initiates no channel occupancy within COT corresponding to channel occupancy initiated by the second communication node, and the second communication node is an initiating device.

When the detection result is that the information sent by the second communication node includes unicast traffic data, the first communication node may share COT included by the FFP of channel occupancy initiated by the second communication node, that is, initiate COT corresponding to channel occupancy.

In an embodiment, the unicast traffic data includes one of the following: physical uplink shared channel data; physical downlink shared channel data; physical uplink control channel data; or physical downlink control channel data.

In an embodiment, determining, according to the detection result, COT for data transmission includes, in response to the information sent by the second communication node including group control signaling, sharing COT corresponding to channel occupancy initiated by the second communication node to perform data transmission, where the first communication node initiates no channel occupancy within COT corresponding to channel occupancy initiated by the second communication node, and the second communication node is an initiating device.

When the information sent by the second communication node includes group control signaling, the first communication node may share COT corresponding to channel occupancy initiated by the second communication node to perform data transmission.

In an embodiment, determining, according to the detection result, COT for data transmission includes, in response to the information sent by the second communication node including group control signaling that indicates that the remaining COT length is greater than 0, sharing COT corresponding to channel occupancy initiated by the second communication node to perform data transmission, where the first communication node initiates no channel occupancy within COT corresponding to channel occupancy initiated by the second communication node, and the second communication node is an initiating device.

In this embodiment, when the detection result is that the information sent by the second communication node includes group control signaling, the first communication node may determine, according to the content indicated by the group control signaling, COT for data transmission. For example, when the group control signaling indicates that the remaining COT length is greater than 0, the first communication node shares COT corresponding to channel occupancy initiated by the second communication node to perform data transmission.

In an embodiment, determining, according to the detection result, COT for data transmission includes, in response to the information sent by the second communication node including group control signaling that indicates that the remaining COT length is equal to 0, not sharing COT corresponding to channel occupancy initiated by the second communication node to perform data transmission, where the first communication node initiates no channel occupancy within COT corresponding to channel occupancy initiated by the second communication node, and the second communication node is an initiating device.

When the detection result is that the information sent by the second communication node includes group control signaling, this embodiment may determine, according to the content indicated by the group control signaling, COT for data transmission.

In an embodiment, determining, according to the detection result, COT for data transmission includes, in response to the information sent by the second communication node including group control signaling that indicates that the remaining COT length is a predefined row and the first communication node satisfying a channel occupancy initiation condition, initiating channel occupancy for data transmission, where the predefined row includes a row having a predefined row index or a row having a predefined information indication combination, and the second communication node serves as a responding device.

The predefined row may be construed as a row pre-agreed by, for example, the first communication node and the second communication node.

The predefined information indication combination may be construed as a combination of a predefined row index and the corresponding row content. If the predefined row index is the first row, the corresponding row content is empty.

The channel occupancy initiation condition includes the following: The start position of data transmission is aligned with the start position of the FFP of the first communication node, and the end position of data transmission ends before the idle period of the FFP. For example, when the transmission is configured grant transmission, the channel occupancy initiation condition may be that the start position of the configured grant transmission is aligned with the start position of the FFP and that the end position of the configured grant transmission ends before the idle period of the FFP; and when the transmission is dynamic grant transmission, the channel occupancy initiation condition may be that the start position of the dynamic grant transmission is aligned with the start position of the FFP and that the end position of the dynamic grant transmission ends before the idle period of the FFP.

The end position of the transmission is within the same FFP as the start position of the transmission and does not extend to another FFP.

In an embodiment, the group control signaling includes the downlink control information format 2_0.

In an embodiment, the channel occupancy time determination method includes one of the following: The second communication node transmits the group control signaling at the start position of COT of a fixed frame period (FFP) of the second communication node; or the second communication node transmits the group control signaling in a first transmission cluster transmitted at the start position of COT of the FFP of the second communication node.

The transmission cluster may be a transmission set of the same device. The transmission set contains multiple transmissions. The interval between adjacent ones of the multiple transmissions is not greater than X microseconds. Here X is a fixed value, for example, 16.

In an embodiment, the channel occupancy time determination method includes one of the following: The second communication node transmits the group control signaling at the start position at which COT starts to be shared; or the second communication node transmits the group control signaling in a first transmission cluster transmitted at the start position at which COT starts to be shared.

In an embodiment, determining, according to the detection result, COT for data transmission includes, in response to detecting no group control signaling sent by the second communication node and detecting unicast traffic data sent by the second communication node, sharing COT corresponding to channel occupancy initiated by the second communication node to perform data transmission, where the first communication node initiates no channel occupancy within COT corresponding to channel occupancy initiated by the second communication node, and the second communication node is an initiating device.

In an embodiment, determining, according to the detection result, COT for data transmission includes, in response to detecting no group control signaling sent by the second communication node, not sharing COT corresponding to channel occupancy initiated by the second communication node to perform data transmission, where the first communication node initiates no channel occupancy within COT corresponding to channel occupancy initiated by the second communication node; and in response to the first communication node receiving the group control signaling for the first time, determining, according to information indicated by the group control signaling, COT for data transmission.

In an embodiment, determining, according to the detection result, COT for data transmission includes, in response to detecting no group control signaling sent by the second communication node and in response to the first communication node satisfying a channel occupancy initiation condition, initiating channel occupancy for data transmission.

In an embodiment, the channel occupancy time determination method also includes, in response to receiving the group control signaling transmitted by the second communication node after initiating the channel occupancy successfully, determining COT of subsequent data transmission according to the group control signaling.

In an embodiment, determining COT of subsequent data transmission according to the group control signaling includes, in response to the group control signaling instructing the first communication node not to initiate the channel occupancy, releasing the subsequent usage right of COT of the first communication node.

In an embodiment, the channel occupancy time determination method also includes that in response to the group control signaling instructing the first communication node to be able to share COT of the second communication node, the first communication node is able to share COT of the second communication node to perform data transmission.

In an embodiment, the channel occupancy time determination method also includes that in response to the group control signaling instructing the first communication node not to share COT of the second communication node, the first communication node does not transmit data in COT of the second communication node.

In an embodiment, determining COT of subsequent data transmission according to the group control signaling includes that in response to the group control signaling instructing the first communication node to be able to initiate channel occupancy, the first communication node is able to continue using COT corresponding to the initiated channel occupancy to perform data transmission.

In an embodiment, the channel occupancy time determination method also includes, in response to data transmission being dynamic grant transmission, in response to the information sent by the second communication node including control signaling that is configured to schedule the dynamic grant transmission and indicate that the type of a CCA is LBT-free, and in response to the dynamic grant transmission being within valid COT of the second communication node, sharing COT of the second communication node to perform the dynamic grant transmission.

The LBT-free means that the control signaling indicates that the first communication node is able to perform the dynamic grant transmission without performing the CCA.

In an embodiment, the channel occupancy time determination method also includes, while the first communication node is sharing COT of the second communication node, determining whether to perform the CCA and what is the type of the performed CCA according to the interval between the dynamic grant transmission and the previous transmission in COT of the second communication node.

In an embodiment, the channel occupancy time determination method also includes that in response to data transmission being dynamic grant transmission that satisfies a channel occupancy initiation condition and in response to the information sent by the second communication node including control signaling that is configured to schedule the dynamic grant transmission and indicate that the type of a CCA is LBT, the first communication node serves as an initiating device to initiate channel occupancy for the dynamic grant transmission.

In an embodiment, the channel occupancy initiation condition includes the following: The start position of data transmission is aligned with the start position of the FFP of the first communication node, and the end position of data transmission ends before the idle period of the FFP.

In an embodiment, the channel occupancy time determination method also includes, in response to data transmission being dynamic grant transmission and in response to the information sent by the second communication node including control signaling that is configured to schedule the dynamic grant transmission, determining, according to a 1-bit field added to the control signaling, COT used for the dynamic grant transmission.

The following gives an example description of the present application. The channel occupancy time determination method of the present application may be considered as a channel occupancy time sharing and initiating method.

In the case where the start position of data transmission of a device is aligned with the start position of the fixed frame period of the device and the data transmission ends before the idle period of the fixed frame period, no valid scheme is proposed for whether the device performs channel access to acquire COT for data transmission or shares COT of an initiating device to perform data transmission. Also, no valid scheme is proposed to prevent two devices communicating with each from both serving as an initiating device and thus prevent COTs of the two devices from taking effect simultaneously. That is, in the case where both a UE and a base station can serve as an initiating device to initiate channel occupancy, valid COT of the UE may overlap valid COT of the base station. When valid COTs overlap, the UE may transmit data by using COT corresponding to channel occupancy initiated by the UE or may transmit data by using COT corresponding to channel occupancy initiated by the base station. The UE and the base station differ in COT length and start position, so data transmission of the UE by sharing COT of the base station and data transmission of the UE by using COT of the UE differ from each other. Therefore, when the UE performs data transmission, it is required to indicate COT used by the UE to perform data transmission or to avoid an overlap between COT of the UE and COT of the base station. The present application determines a channel occupancy initiation trigger condition of a device and prevents overlapping valid COTs by preventing two devices communicating with each from both serving as an initiating device.

Embodiment One

A device operating in the FBE mode serves an initiating device. The device may perform CCA detection in an idle period. When a channel is detected to be idle after the CCA is performed, the device may occupy COT of the next FFP adjacent to the idle period to perform data transmission. The responding device of the initiating device may share COT for data transmission. For example, a base station serves as an initiating device to perform CCA detection in an idle period. If a channel detected by the CCA is idle, the base station may occupy COT of the next adjacent FFP to transmit data. The remaining part of the COT may be shared by a responding device, for example, a UE, of the base station. If a base station initiates channel occupancy, then a responding device UE may share COT of the base station to perform data transmission. If the start position of data transmission of a UE is aligned with the start position of the FFP of the start position of the UE and the data transmission ends before the idle period of the FFP, then the UE may serve as an initiating device to initiate channel occupancy for the data transmission.

The following describes schemes for whether a device operating in the FBE mode serves as a responding device to share COT to perform data transmission of the responding device or serves as an initiating device to initiate channel occupancy and use COT corresponding to the initiated channel occupancy to perform data transmission of the initiating device.

Scheme 1: When device 1, that is, a first communication initiates no channel occupancy and detects unicast traffic data sent by device 2, that is, a second communication node, device 1 considers that device 2 initiates channel occupancy and acquires the corresponding COT, and device 1 serves as the responding device of device 2. The responding device may share COT corresponding to channel occupancy initiated by the initiating device (device 2) to transmit the traffic data of the responding device. The responding device does not initiate channel occupancy within COT of the initiating device. The unicast traffic data may be physical uplink shared channel (PUSCH) data; physical downlink shared channel (PDSCH) data; physical uplink control channel (PUCCH) data; or physical downlink control channel (PDCCH) data. Device 1 and device 2 can communicate with each other. For example, device 1 is a UE, and device 2 is a base station.

For example, the base station serves as an initiating device to perform CCA detection in an idle period. If a channel is detected to be idle after the CCA is performed, then the base station sends a PDSCH by using COT of the FFP adjacent to the idle period. If the responding device UE does not initiate channel occupancy, then after receiving the PDSCH, the UE considers that the base station has initiated channel occupancy successfully, the UE may share COT of the base station to perform uplink (UL) data transmission, and the UE does not initiate channel occupancy within COT of the base station.

Scheme 2: When device 1 initiates no channel occupancy and detects group control signaling sent by device 2, device 1 considers that device 2 initiates channel occupancy and acquires the corresponding COT, and device 1 serves as the responding device of device 2. The responding device may share COT corresponding to channel occupancy initiated by the initiating device (device 2) to transmit the traffic data of the responding device. The responding device does not initiate channel occupancy within COT of the initiating device. Device 1 and device 2 can communicate with each other. For example, device 1 is a UE, and device 2 is a base station. The group control signaling may be the downlink control information (DCI) format 2_0. The DCI format 2_0 contains indication of the remaining COT length.

Further, when device 1 detects group control signaling that is sent by device 2 and that indicates that the remaining COT length is greater than 0, device 1 considers that device 2 initiates channel occupancy and acquires the corresponding COT, and device 1 serves as the responding device of device 2 and considers that the current COT is COT corresponding to channel occupancy initiated by the initiating device (device 2). In this case, the responding device may share COT corresponding to channel occupancy initiated by the initiating device to transmit the traffic data of the responding device, and the responding device does not initiate channel occupancy within COT of the initiating device.

For example, the base station serves as an initiating device to perform CCA detection in an idle period. If a channel detected by the CCA is idle, the base station occupies COT of the FFP adjacent to the idle period to transmit downlink (DL) data and sends the DCI format 2_0 within the COT to notify the UE that the remaining COT length is greater than 0. The UE receives that the remaining COT has a length of greater than 0 indicated by the DCI format 2_0, considers that the base station initiates channel occupancy at the start position of the configured FFP and acquires the corresponding COT. In this case, the UE may serve as a responding device to share the COT to perform data transmission and cannot initiate channel occupancy within the configured COT of the base station.

Further, when device 1 detects group control signaling that is sent by device 2 and that indicates that the remaining COT length is equal to 0, device 1 considers that device 2 initiates channel occupancy and acquires the corresponding COT, and device 1 serves as the responding device of device 2 and considers that the current COT is COT corresponding to channel occupancy initiated by the initiating device (device 2). In this case, the responding device cannot share COT corresponding to channel occupancy initiated by the initiating device (device 2) to transmit the traffic data of the responding device, and the responding device does not initiate channel occupancy within COT of the initiating device.

Further, when device 1 detects group control signaling that is sent by device 2 and that indicates that the remaining COT length is a predefined row, device 1 considers that device 2 shares COT corresponding to channel occupancy initiated by device 3. In this case, device 2 serves as the responding device of device 3, device 1 does not share COT of device 2 to transmit the traffic data of device 1, and when satisfying a channel occupancy initiation condition, device 1 may serve as an initiating device to initiate channel occupancy for traffic data transmission of device 1. The defined row refers to a row having a defined row index, for example, the first row or the last row. The defined row may also be a row having a defined information indication combination, for example, a row indicating that the remaining COT length is empty or the first or last row indicating that the remaining COT length is 0. Device 3 and device 2 can communicate with each other. For example, device 1 is UE 1, device 2 is a base station, and device 3 is UE 2. The channel occupancy initiation condition means that the start position of transmission of a device is aligned with the start position of the FFP of the device and that the end position of the transmission ends before the idle period of the FFP.

For example, UE 1, UE 2, and the base station are each configured with an FFP. The base station does not initiate channel occupancy in the idle period; or detects by CCA that the channel is busy in the idle period and fails to initiate channel occupancy. UE 2 detects by CCA that the channel is idle in the corresponding idle period and initiates channel occupancy successfully. The base station shares COT of UE 2 to perform DL data transmission. The DL data transmission contains the DCI format 2_0. The DCI format 2_0 indicates the remaining COT length by using the first row of a COT length indication list, and the first row indicates that the remaining COT length is 0. UE 1 receives the remaining COT length indicated by the DCI format 2_0 and the corresponding indication row index and considers that the base station shares COT of another device. If UL transmission of UE 1 is aligned with the start position of the FFP configured for UE 1 and ends before the idle period of the FFP, then UE 1 may perform CCA detection in the idle period immediately before the FFP and try to initiate channel occupancy. If UE 1 initiates channel occupancy successfully, UE 1 may perform UL transmission by using COT corresponding to channel occupancy initiated by UE 1.

In this embodiment, a condition is determined for whether a device serves as an initiating device or a responding device. That is, when unicast data transmission is detected, when group control signaling is detected, or when group control signaling is detected to indicate that the remaining COT length is greater than 0, the device serves as a responding device to share COT of an initiating device to perform transmission. When the device detects that the remaining COT length indicated by the group control signaling is 0, two cases happen. (1) If another device communicating with the device is an initiating device, the device does not initiate channel occupancy within valid COT of the initiating device. (2) If another device communicating with the device shares COT initiated by a third device, the device initiates channel occupancy when satisfying the channel occupancy initiation condition.

Embodiment Two

A device operating in the FBE mode serves as an initiating device. The device may perform CCA detection in an idle period. If a channel is detected to be idle after the CCA is performed, the device may occupy COT of the next adjacent FFP to transmit data. The responding device of the initiating device may share the COT to perform data transmission. For example, a base station serves as an initiating device to perform CCA detection in the idle period. If a channel is detected to be idle after the CCA is performed, the base station may occupy COT of the next adjacent FFP to transmit data. The base station first performs DL transmission and may share the remaining COT with the responding device, for example, UE, of the base station. When the base station initiates channel occupancy, the responding device UE may share COT of the base station to perform data transmission. If the start position of data transmission of the UE is aligned with the start position of the FFP of the UE and ends before the idle period of the FFP, then the UE may serve as an initiating device to initiate channel occupancy to perform data transmission.

Based on scheme 2 of embodiment one, when device 2 sends group control signaling, two schemes are provided.

Scheme 1: As an initiating device, device 2 transmits the group control signaling at the start position of COT of the FFP. As a responding device, device 2 sends the group control signaling at the start position where COT of device 3 starts to be shared.

Scheme 2: As an initiating device, device 2 sends the group control signaling in the first transmission cluster transmitted at the start position of COT of the FFP. As a responding device, device 2 sends the group control signaling in the first transmission cluster transmitted at the start position where COT of device 3 starts to be shared. The transmission cluster is a transmission set of the same device. The transmission set contains multiple transmissions. The interval between adjacent ones of the multiple transmissions is not greater than X microseconds. Here X is a fixed value, for example, 16.

For example, a base station serves as an initiating device to perform CCA detection in an idle period. If a channel is detected to be idle after the CCA is performed, then the base station sends DL data by using COT of the FFP adjacent to the idle period, and the base station notifies the remaining COT length by sending the DCI format 2_0 at the start position of the COT or notifies the remaining COT length by sending the DCI format 2_0 in the first transmission cluster sent at the start position of the COT.

UE 1, UE 2, and the base station are each configured with an FFP. The base station does not initiate channel occupancy in the idle period; or detects by CCA that the channel is busy in the idle period and fails to initiate channel occupancy. UE 2 detects by CCA that the channel is idle in the corresponding idle period and initiates channel occupancy successfully. The base station shares COT of UE 2 to perform DL data transmission. The base station notifies the remaining COT length by sending the DCI format 2_0 at the start position at which COT of UE 2 starts to be shared or notifies the remaining COT length by sending the DCI format 2_0 in a first transmission cluster sent at the start position at which COT of UE 2 starts to be shared.

When device 1 detects the group control signaling sent by device 2, missing detection of the group control signaling may occur. This problem may be solved using the following schemes.

Scheme 1: When device 1 detects no group control signaling sent by device 2 in the COT but detects unicast traffic data sent by device 2 to device 1, device 1 serves as the responding device of device 1. The responding device may share COT corresponding to channel occupancy initiated by the initiating device (device 2) to transmit the traffic data of the responding device. The responding device does not initiate channel occupancy within COT of the initiating device.

For example, a base station serves as an initiating device to perform CCA detection in an idle period. If a channel is detected to be idle after the CCA is performed, then the base station performs DL data transmission by using COT of the FFP adjacent to the idle period. The DL data transmission contains the DCI format 2_0 and a PDSCH. If a UE detects no DCI format 2_0 but detects the PDSCH, the UE considers that the base station serves as an initiating device that has initiated channel occupancy successfully and that has acquired the corresponding COT; and the UE may share the COT to perform UL data transmission of the UE.

Scheme 2: If device 1 detects no group control signaling sent by device 2 in COT, then device 1 does not share the COT to perform data transmission of device 1 and does not initiate channel occupancy in the COT to perform data transmission of device 1. When device 1 receives group control signaling in COT of device 2 for the first time, it is determined, according to information indicated by the group control signaling and scheme 2 of embodiment one, whether device 1 shares COT of device 2 or serves as an initiating device to initiate channel occupancy to perform traffic data transmission of device 1.

Scheme 3: If device 1 detects no group control signaling sent by device 2 in COT, then device 1 initiates channel occupancy for data transmission of device 1 when satisfying a channel occupancy initiation condition. When device 1 serves as an initiating device that has initiated channel occupancy successfully and then receives group control signaling in COT of device 2, if the group control signaling determines, according to scheme 2 of embodiment one, that device 1 should not initiate channel occupancy, then device 1 releases the subsequent usage right of COT corresponding to channel occupancy initiated by device 1 after receiving the group control signaling; if the group control signaling indicates that device 1 can initiate channel occupancy, then device 1 can continue using COT corresponding to channel occupancy initiated by device 1 to perform data transmission of device 1; and if the group control signaling indicates that device 1 can share COT of device 2, then device 1 can share COT of device 2 to perform traffic data transmission of device 1; otherwise device 1 cannot transmit data again in COT of device 2.

For example, a base station serves as an initiating device to perform CCA detection in an idle period. If a channel is detected to be idle after the CCA is performed, the base station sends DL data by using COT of the FFP adjacent to the idle period. The DL data transmission contains two transmissions in the DCI format 2_0. If the UE fails to detect the first transmission in the DCI format 2_0, UL data transmission of the UE is aligned with the start position of the FFP configured for the UE, and the UL data transmission ends before the idle period of the FFP of the UE, then the UE serves as an initiating device to perform CCA detection in the idle period adjacent to the FFP of the UE. If a channel is detected to be idle after the CCA is performed, the UE initiates channel occupancy successfully and uses the COT to perform UL data transmission. The UE detects the DCI format 2_0 when the second DCI format 2_0 arrives. If the DCI format 2_0 indicates that the UE should not initiate channel occupancy, the UE terminates UL data transmission in COT of the UE after receiving the DCI format 2_0. If the DCI format 2_0 notifies that the UE can share COT of the base station, then the UE can share COT of the base station to perform UL data transmission.

This embodiment determines the sending position of the group control signaling of embodiment one and determines how a device determines COT used for transmission by the device when missing detection of the group control signaling occurs.

Embodiment Three

A device operating in the FBE mode serves as an initiating device. The device may perform CCA detection in an idle period. If a channel is detected to be idle after the CCA is performed, the device may occupy COT of the next adjacent FFP to transmit data. The responding device of the initiating device may share the COT to perform data transmission. For example, a base station serves as an initiating device to perform CCA detection in the idle period. If a channel is detected to be idle after the CCA is performed, the base station may occupy COT of the next adjacent FFP to transmit data. The base station first performs DL transmission and may share the remaining COT with the responding device, for example, UE, of the base station. When the base station initiates channel occupancy, the responding device UE may share COT of the base station to perform data transmission. If the start position of data transmission of the UE is aligned with the start position of the FFP of the UE and ends before the idle period of the FFP, then the UE may serve as an initiating device to initiate channel occupancy to perform data transmission.

The present application also provides a configured grant data transmission method. The method is applied to a first communication node. The method includes that when the first communication node initiates no channel occupancy, data transmitted by the first communication node is configured grant data, and the first communication node satisfies a channel occupancy initiation condition, the first communication node performs CCA detection in the idle period immediately before the FFP of the first communication node; when a channel is detected to be idle after the CCA is performed, the first communication node initiates channel occupancy successfully and uses COT corresponding to the initiated channel occupancy to transmit the configured grant data; and when a channel is detected to be busy after the CCA is performed, the next configured grant transmission opportunity is within valid COT of a second communication node, and the first communication node can share COT of the second communication node, the first communication node shares COT of the second communication node to transmit the configured grant data.

In an embodiment, COT used for the configured grant transmission is notified when the configured grant transmission is performed.

In an embodiment, the following applies: When the first communication node performs configured grant transmission that satisfies the channel occupancy initiation condition, Configured Grant Uplink Control Information (CG-UCI) indicates COT used for the configured grant transmission. When the first communication node performs configured grant transmission that satisfies the channel occupancy initiation condition, a channel access priority class (CAPC) in COT sharing information in the CG-UCI indicates COT used for the configured grant transmission. When the first communication node performs configured grant transmission that satisfies the channel occupancy initiation condition, 1-bit information added to the CG-UCI indicates COT used for the configured grant transmission. When the first communication node performs configured grant transmission that satisfies the channel occupancy initiation condition, a special combination of the CAPC, the lasting time, and the offset value in the CG-UCI notifies COT used for the configured grant transmission. When the first communication node performs configured grant transmission that satisfies the channel occupancy initiation condition, a definite row index in the CG-UCI indicates COT used for the configured grant transmission.

This embodiment is described hereinafter illustratively.

If the start position of configured grant transmission of device 1 operating in the FBE mode is aligned with the start position of the FFP of device 1 and the end position of the configured grant transmission ends before the idle period of the FFP, then device 1 performs CCA detection in the idle period immediately before the FFP and initiates channel occupancy.

Scheme 1: If a channel is detected to be idle after device 1 performs a CCA, device 1 initiates channel occupancy successfully and uses COT corresponding to the initiated channel occupancy to perform configured grant transmission.

Scheme 2: If a channel is detected to be busy after device 1 performs a CCA and if the next configured grant transmission opportunity of device 1 is within valid COT of device 2 that communicates with device 1, then device 1 serves as a responding device to share COT of device 2 to perform configured grant transmission.

If a device can initiate channel occupancy as long as configured grant transmission satisfies a channel occupancy initiation condition, multiple initiating devices occur and valid COTs overlap. To ensure that a consistent understanding of COT used for the configured grant transmission is achieved between communication devices, it is required to notify COT used for the configured grant transmission while performing the configured grant transmission. Further, configured grant transmission is configured grant PUSCH (CG-PUSCH) transmission, and COT used for CG-PUSCH transmission is notified by CG-UCI. Further, a CAPC in COT sharing information in the CG-UCI notifies COT used for the CG-PUSCH transmission; 1-bit information added to the CG-UCI indicates COT used for the CG-PUSCH transmission; a special combination of the CAPC, the lasting time, and the offset value in the CG-UCI notifies COT used for the CG-PUSCH transmission; or a definite row index in the CG-UCI indicates COT used for the CG-PUSCH transmission.

This embodiment provides a scheme for configured grant transmission in a particular scenario as follows: If the start position of configured grant transmission of a device is aligned with the start position of the FFP of the device and ends before the idle period of the FFP, then the device serves as an initiating device to initiate channel occupancy and use COT corresponding to the initiated channel occupancy to perform the configured grant transmission. If the device serves as an initiating device that fails to initiate channel occupancy but the subsequent transmission opportunity is still within COT of another initiating device communicating with the device, then the device switches to a responding device to share COT of the another initiating device to perform transmission. If two communication parties are both initiating devices, this embodiment describes how to make the two communication parties have a consistent understanding of COT used for transmission, that is, how to clearly indicate COT used for the configured grant transmission.

Embodiment Four

A device operating in the FBE mode serves as an initiating device. The device may perform CCA detection in an idle period. If a channel is detected to be idle after the CCA is performed, the device may occupy COT of the next adjacent FFP to transmit data. The responding device of the initiating device may share the COT to perform data transmission. For example, a base station serves as an initiating device to perform CCA detection in the idle period. If a channel is detected to be idle after the CCA is performed, the base station may occupy COT of the next adjacent FFP to transmit data. The base station first performs DL transmission and may share the remaining COT with the responding device, for example, UE, of the base station. When the base station initiates channel occupancy, the responding device UE may share COT of the base station to perform data transmission. If the start position of data transmission of the UE is aligned with the start position of the FFP of the UE and ends before the idle period of the FFP, then the UE may serve as an initiating device to initiate channel occupancy to perform data transmission.

The present application also provides a dynamic grant data transmission method. The method is applied to a first communication node. The method includes that when data transmitted by the first communication node is dynamic grant data, if dynamic grant transmission is after the start position of the first communication node FFP and ends before the idle period of the FFP and if the first communication node has initiated channel occupancy successfully before the dynamic grant transmission is performed, then the dynamic grant transmission is performed according to COT corresponding to the initiated channel occupancy; otherwise, the first communication node serves as a responding device, the dynamic grant transmission is within COT of the valid FFP of the initiating device and ends before the idle period of the FFP, and the dynamic grant transmission is performed by using shared COT of the initiating device.

The present application is described hereinafter illustratively.

If a device operating in the FBE mode has initiated channel occupancy and acquired corresponding COT before dynamic grant transmission, the dynamic grant transmission is performed according to COT corresponding to channel occupancy initiated by the device; otherwise, the device serves as a responding device. If the dynamic grant transmission is within COT of the valid FFP of the initiating device and ends before the idle period of the FFP, then the dynamic grant transmission is performed by using shared COT of the initiating device.

For example, when dynamic grant transmission of a UE starts after the FFP of the UE and ends before the idle period of the FFP of the UE, if the UE has initiated channel occupancy before performing scheduling transmission and acquired the usage right of COT of the FFP, then the UE performs the dynamic grant transmission according to the FFP of the UE; otherwise, if the UE initiates no channel occupancy before performing scheduling transmission and if the dynamic grant transmission is within valid COT of the base station, then the dynamic grant transmission is performed by using shared COT of the base station.

The start position of dynamic grant transmission of a device operating in the FBE mode is aligned with the start position of the FFP of the device and ends before the idle period of the FFP.

Scheme 1: Control signaling for scheduling the dynamic grant transmission indicates that the type of the CCA of the device is LBT-free, and the device serves as a responding device. If the responding device determines that the dynamic grant transmission is within valid COT of an initiating device, the responding device shares COT of the initiating device to perform the dynamic grant transmission; and while the device is sharing COT of the initiating device, whether to perform the CCA and what is the type of the performed CCA are determined according to the interval between the dynamic grant transmission and the previous transmission in the COT. The LBT-free means that the control signaling indicates that the first communication node may perform the dynamic grant transmission without performing the CCA.

Scheme 2: If the control signaling for scheduling dynamic grant transmission indicates that the type of the CCA of the device is LBT, then the device serves as an initiating device to initiate channel occupancy for the dynamic grant transmission.

Scheme 3: A 1-bit field is added to the control signaling for scheduling dynamic grant transmission to instruct the device to share COT of an initiating device or initiate channel occupancy for the dynamic grant transmission.

This embodiment provides a scheme for dynamic grant transmission in a particular scenario as follows: If dynamic grant transmission of a device is scheduled after the start position of the FFP of the device and is aligned with the start position of the FFP of the device, this embodiment describes how to select COT used for the transmission. If the start position of the dynamic grant transmission of the device is aligned with the start position of the FFP of the device, it is determined, according to instruction of the scheduling control signaling, whether transmission of the device is performed by using shared COT of an initiating device or by using channel occupancy initiated by itself.

Figure 2:
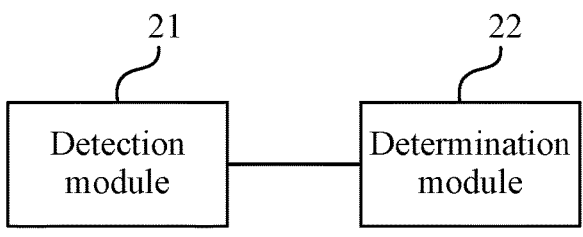
FIG. 2 is a diagram illustrating the structure of a channel occupancy time determination apparatus according to an embodiment of the present application.

An example embodiment of the present application provides a channel occupancy time determination apparatus. FIG. 2 is a diagram illustrating the structure of a channel occupancy time determination apparatus according to an embodiment of the present application. This apparatus may be configured in a first communication node. The apparatus includes a detection module 21 configured to, in response to the first communication node initiating no channel occupancy, detect information sent by a second communication node; and a determination module 22 configured to determine, according to the detection result, COT for data transmission.

The channel occupancy time determination apparatus of this embodiment is configured to perform the channel occupancy time determination method of any previous embodiment of the present application. The implementation principles and technical effects of the channel occupancy time determination apparatus of this embodiment are similar to those of the channel occupancy time determination method of any previous embodiment of the present application and thus are not described here again.

Based on the previous embodiment, variant embodiments of the previous embodiment are provided. It is to be noted here that for ease of description, only differences from the previous embodiment are described in the variant embodiments.

In an embodiment, the determination module 22 is configured to, in response to the information sent by the second communication node including unicast traffic data, share COT corresponding to channel occupancy initiated by the second communication node to perform data transmission, where the first communication node initiates no channel occupancy within COT corresponding to channel occupancy initiated by the second communication node, and the second communication node is an initiating device.

In an embodiment, the unicast traffic data includes one of the following: physical uplink shared channel data; physical downlink shared channel data; physical uplink control channel data; or physical downlink control channel data.

In an embodiment, the determination module 22 is configured to, in response to the information sent by the second communication node including group control signaling, share COT corresponding to channel occupancy initiated by the second communication node to perform data transmission, where the first communication node initiates no channel occupancy within COT corresponding to channel occupancy initiated by the second communication node, and the second communication node is an initiating device.

In an embodiment, the determination module 22 is configured to, in response to the information sent by the second communication node including group control signaling that indicates that the remaining COT length is greater than 0, share COT corresponding to channel occupancy initiated by the second communication node to perform data transmission, where the first communication node initiates no channel occupancy within COT corresponding to channel occupancy initiated by the second communication node, and the second communication node is an initiating device.

In an embodiment, the determination module 22 is configured to, in response to the information sent by the second communication node including group control signaling that indicates that the remaining COT length is equal to 0, not share COT corresponding to channel occupancy initiated by the second communication node to perform data transmission, where the first communication node initiates no channel occupancy within COT corresponding to channel occupancy initiated by the second communication node, and the second communication node is an initiating device.

In an embodiment, the determination module 22 is configured to, in response to the information sent by the second communication node including group control signaling that indicates that the remaining COT length is a predefined row and the first communication node satisfying a channel occupancy initiation condition, initiate channel occupancy for data transmission, where the predefined row includes a row having a predefined row index or a row having a predefined information indication combination, and the second communication node serves as a responding device.

In an embodiment, the group control signaling includes the downlink control information format 2_0.

In an embodiment, the channel occupancy time determination apparatus includes one of the following: The second communication node transmits the group control signaling at the start position of COT of a fixed frame period (FFP) of the second communication node; or the second communication node transmits the group control signaling in a first transmission cluster transmitted at the start position of COT of the FFP of the second communication node.

In an embodiment, the channel occupancy time determination apparatus includes one of the following: The second communication node transmits the group control signaling at the start position at which COT starts to be shared; or the second communication node transmits the group control signaling in a first transmission cluster transmitted at the start position at which COT starts to be shared.

In an embodiment, the determination module 22 is configured to, in response to detecting no group control signaling sent by the second communication node and detecting unicast traffic data sent by the second communication node, share COT corresponding to channel occupancy initiated by the second communication node to perform data transmission, where the first communication node initiates no channel occupancy within COT corresponding to channel occupancy initiated by the second communication node, and the second communication node is an initiating device.

In an embodiment, the determination module 22 is configured to, in response to detecting no group control signaling sent by the second communication node, not share COT corresponding to channel occupancy initiated by the second communication node to perform data transmission, where the first communication node initiates no channel occupancy within COT corresponding to channel occupancy initiated by the second communication node; and in response to the first communication node receiving the group control signaling for the first time, determine, according to information indicated by the group control signaling, COT for data transmission.

In an embodiment, the determination module 22 is configured to, in response to detecting no group control signaling sent by the second communication node and in response to the first communication node satisfying a channel occupancy initiation condition, initiate channel occupancy for data transmission.

In an embodiment, the channel occupancy time determination apparatus also includes a subsequent COT determination module configured to, in response to receiving the group control signaling transmitted by the second communication node after initiating the channel occupancy successfully, determine COT of subsequent data transmission according to the group control signaling.

In an embodiment, the subsequent COT determination module is configured to, in response to the group control signaling instructing the first communication node not to initiate the channel occupancy, release the subsequent usage right of COT of the first communication node.

In an embodiment, the channel occupancy time determination apparatus also includes that in response to the group control signaling instructing the first communication node to be able to share COT of the second communication node, the first communication node is able to share COT of the second communication node to perform data transmission.

In an embodiment, the channel occupancy time determination apparatus also includes that in response to the group control signaling instructing the first communication node not to share COT of the second communication node, the first communication node does not transmit data in COT of the second communication node.

In an embodiment, the subsequent COT determination module is configured such that in response to the group control signaling instructing the first communication node to be able to initiate the channel occupancy, the first communication node is able to continue using COT corresponding to the initiated channel occupancy to perform data transmission.

In an embodiment, the channel occupancy time determination apparatus also includes a sharing module configured to, in response to data transmission being dynamic grant transmission, in response to the information sent by the second communication node including control signaling that is configured to schedule the dynamic grant transmission and indicate that the type of a CCA is LBT-free, and in response to the dynamic grant transmission being within valid COT of the second communication node, share COT of the second communication node to perform the dynamic grant transmission. The LBT-free means that the control signaling indicates that the first communication node is able to perform the dynamic grant transmission without performing the CCA.

In an embodiment, the channel occupancy time determination module also includes a CCA determination module configured to, while the first communication node is sharing COT of the second communication node, determine whether to perform the CCA and what is the type of the performed CCA according to the interval between the dynamic grant transmission and the previous transmission in COT of the second communication node.

In an embodiment, the channel occupancy time determination module also includes an initiating module configured such that in response to data transmission being dynamic grant transmission that satisfies a channel occupancy initiation condition and in response to the information sent by the second communication node including control signaling that is configured to schedule the dynamic grant transmission and indicate that the type of a CCA is LBT, the first communication node serves as an initiating device to initiate channel occupancy for the dynamic grant transmission.

In an embodiment, the channel occupancy initiation condition includes the following: The start position of data transmission is aligned with the start position of the FFP of the first communication node, and the end position of data transmission ends before the idle period of the FFP.

In an embodiment, the channel occupancy time determination apparatus also includes a COT determination module configured to, in response to data transmission being dynamic grant transmission and in response to the information sent by the second communication node including control signaling that is configured to schedule the dynamic grant transmission, determine, according to a 1-bit field added to the control signaling, COT used for the dynamic grant transmission.

Figure 3:
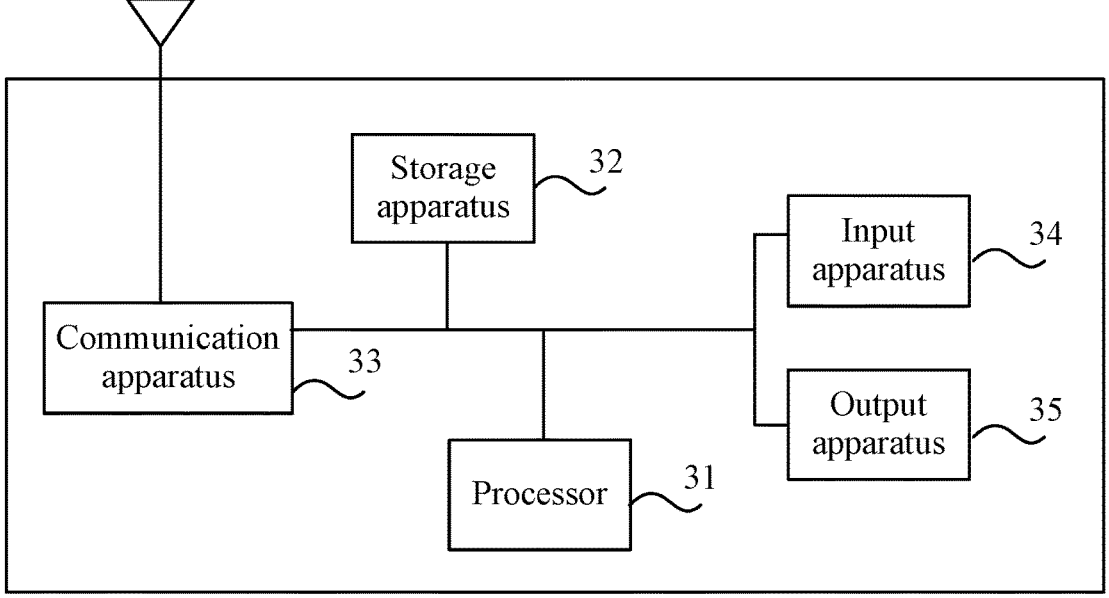
FIG. 3 is a diagram illustrating the structure of a first communication node according to an embodiment of the present application.

An embodiment of the present application provides a first communication node. FIG. 3 is a diagram illustrating the structure of a first communication node according to an embodiment of the present application. As shown in FIG. 3, the first communication node of the present application includes at least one processor 31 and a storage apparatus 32 configured to store at least one program. FIG. 3 uses one processor 31 as an example. When the at least one program is executed by the at least one processor 31, the at least one processor 31 performs the channel occupancy time determination method of any previous embodiment of the present application.

The first communication node also includes a communication apparatus 33, an input apparatus 34, and an output apparatus 35.

The processor 31, the storage apparatus 32, the communication apparatus 33, the input apparatus 34, and the output apparatus 35 in the first communication node may be connected via a bus or other means, with connection via a bus as an example in FIG. 3.

The input apparatus 34 may be configured to receive input digital or character information and to generate key signal input related to user settings and function control of the first communication node. The output apparatus 35 may include a display screen and other display devices.

The communication apparatus 33 may include a receiver and a transmitter. The communication apparatus 33 is configured to perform information transceiving communication under the control of the processor 31.

As a computer-readable storage medium, the storage apparatus 32 may be configured to store software programs, computer-executable programs, and modules such as program instructions/modules (for example, the detection module 21 and the determination module 22 in the channel occupancy time determination apparatus) corresponding to the channel occupancy time determination method of any previous embodiment of the present application. The storage apparatus 32 may include a program storage region and a data storage region. The program storage region may store an operating system and an application program required by at least one function. The data storage region may store data created depending on the use of a device. Additionally, the storage apparatus 32 may include a high-speed random-access memory and may further include a nonvolatile memory such as at least one disk memory, a flash memory, or another nonvolatile solid-state memory. In some examples, the storage apparatus 32 may further include memories which are remotely disposed with respect to the processor 31. These remote memories may be connected to the first communication node via a network. Examples of the preceding network include, but are not limited to, the Internet, an intranet, a local area network, a mobile communication network and a combination thereof.

An embodiment of the present application provides a storage medium storing a computer program which, when executed by a processor, causes the processor to perform the channel occupancy time determination method of any previous embodiment of the present application. The method includes, in response to the first communication node initiating no channel occupancy, detecting information sent by a second communication node; and determining, according to the detection result, COT for data transmission.

A computer storage medium in the embodiment of the present application may adopt any combination of one or more computer-readable media. The computer-readable media may be computer-readable signal media or computer-readable storage media. The computer-readable storage medium may be, but is not limited to, an electrical, magnetic, optical, electromagnetic, infrared, or semiconductor system, apparatus, or element, or any combination thereof. The computer-readable storage medium includes (a non-exhaustive list): an electrical connection having one or more wires, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical memory component, a magnetic memory component, or any appropriate combination thereof. The computer-readable storage medium may be any tangible medium including or storing a program. The program may be used by or used in conjunction with an instruction execution system, apparatus, or device.

A computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

The program codes included in the computer-readable medium may be transmitted in any suitable medium including, but not limited to, a wireless medium, a wire, an optical cable, a radio frequency (RF), or any suitable combination thereof.

Computer program codes for performing the operations of the present application may be written in one or more programming languages or combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to the remote computer, the remote computer may be connected to the user computer via any kind of network including a local area network (LAN)

or a wide area network (WAN) or may be connected to an external computer (for example, via the Internet through an Internet service provider).

The preceding shows only example embodiments of the present application and is not intended to limit the scope of the present application.

It is to be understood by those skilled in the art that the first communication node covers any suitable type of radio UE, for example, a mobile phone, a portable data processing device, a portable web browser, or a vehicle-mounted mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another computing device, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored in a memory. The memory may be of any type suitable for the local technical environment and may be implemented by using any suitable data storage technology, such as, but not limited to, a ROM, a RAM, an optical storage device and system (a digital video disc (DVD) or a compact disc (CD)), and the like. Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present application. Accordingly, the proper scope of the present application is determined according to the claims.

What is claimed is:

1. A channel occupancy time determination method, the method being applied to a first communication node and comprising:

in response to the first communication node performing no clear channel assessment (CCA) detection in an idle period of a previous fixed frame period (FFP), detecting information sent by a second communication node in channel occupancy time (COT) of a current FFP to obtain a detection result, wherein the COT of the current FFP is used by the second communication node to perform data transmission of the second communication node; and determining, according to the detection result, COT for data transmission of the first communication node;

wherein determining, according to the detection result, the COT for the data transmission of the first communication node comprises:

in response to the information sent by the second communication node comprising group control signaling that indicates that a remaining COT duration corresponds to a predefined row and the first communication node satisfying a channel occupancy initiation condition, performing CCA detection in an idle period of the current FFP and performing the data transmission of the first communication node in COT of a next FFP, wherein the predefined row comprises a row having a predefined row index or a row having a predefined information indication combination, and the second communication node serves as a responding device.

2. The method of claim 1, wherein determining, according to the detection result, the COT for the data transmission of the first communication node comprises:

in response to the information sent by the second communication node comprising unicast traffic data, sharing the COT of the current FFP to perform the data transmission of the first communication node and performing no CCA detection in an idle period of the current FFP, wherein the second communication node is an initiating device.

3. The method of claim 2, wherein the unicast traffic data comprises one of the following:

physical uplink shared channel data; physical downlink shared channel data; physical uplink control channel data; or physical downlink control channel data.

4. The method of claim 1, wherein determining, according to the detection result, the COT for the data transmission of the first communication node, comprises:

in response to the information sent by the second communication node comprising group control signaling, sharing the COT of the current FFP to perform the data transmission of the first communication node and performing no CCA detection in an idle period of the current FFP, wherein the second communication node is an initiating device.

5. The method of claim 1, wherein determining, according to the detection result, the COT for the data transmission of the first communication node comprises:

in response to the information sent by the second communication node comprising group control signaling that indicates that a remaining COT duration is greater than 0, sharing the COT of the current FFP to perform the data transmission of the first communication node and performing no CCA detection in an idle period of the current FFP, wherein the second communication node is an initiating device.

6. The method of claim 1, wherein determining, according to the detection result, the COT for the data transmission of the first communication node comprises:

in response to the information sent by the second communication node comprising group control signaling that indicates that a remaining COT duration is equal to 0, not sharing the COT of the current FFP to perform the data transmission of the first communication node and performing no CCA detection in an idle period of the current FFP, wherein the second communication node is an initiating device.

7. The method of claim 4, wherein one of the following is satisfied:

the group control signaling is transmitted by the second communication node at a start point of the COT of the current FFP; or the group control signaling is transmitted by the second communication node in a first transmission cluster transmitted at a start point of the COT of the current FFP.

8. The method of claim 1, wherein one of the following is satisfied:

the group control signaling is transmitted by the second communication node at a start point at which the COT of the current FFP starts to be shared; or the group control signaling is transmitted by the second communication node in a first transmission cluster transmitted at a start point at which the COT of the current FFP starts to be shared.

9. The method of claim 4, wherein determining, according to the detection result, the COT for the data transmission of the first communication node comprises:

in response to detecting no group control signaling but detecting unicast traffic data sent by the second communication node, sharing the COT of the current FFP to perform the data transmission of the first communication node and performing no CCA detection in an idle period of the current FFP, wherein the second communication node is the initiating device.

10. The method of claim 4, wherein determining, according to the detection result, the COT for the data transmission of the first communication node comprises:

in response to detecting no group control signaling sent by the second communication node and in response to the first communication node satisfying a channel occupancy initiation condition, performing CCA detection in an idle period of the current FFP to determine whether COT of the next FFP to be used for dynamic grant transmission of the first communication node.

11. The method of claim 10, further comprising:

in response to receiving the group control signaling transmitted by the second communication node after the COT of the next FFP is determined to be used for dynamic grant transmission of the first communication node, determining COT of the next FFP for subsequent data transmission of the first communication node according to the group control signaling.

12. The method of claim 11, wherein determining the COT of the next FFP for the subsequent data transmission of the first communication node according to the group control signaling comprises:

in response to the group control signaling instructing the first communication node to perform no CCA detection in an idle period of the current FFP and perform no data transmission of the first communication node in COT of a next FFP, releasing a subsequent usage right of the COT of the next FFP.

13. The method of claim 12, further comprising:

either in response to the group control signaling instructing the first communication node to be able to share the COT of the current FFP, being able to share the COT of the current FFP to perform the data transmission of the first communication node; or in response to the group control signaling instructing the first communication node not to share the COT of the current FFP, not transmitting data of the first communication node in the COT of the current FFP.

14. The method of claim 11, wherein determining the COT of the next FFP for the subsequent data transmission of the first communication node according to the group control signaling comprises:

in response to the group control signaling instructing the first communication node to be able to perform CCA detection in an idle period of the current FFP, being able to continue using the COT of the next FFP to perform the data transmission of the first communication node.

15. The method of claim 1, wherein determining, according to the detection result, the COT for the data transmission of the first communication node comprises:

in response to the data transmission of the first communication node being dynamic grant transmission which is within a valid COT of the second communication node, and the information sent by the second communication node comprising control signaling that is configured to schedule the dynamic grant transmission and indicates that a type of CCA is listen-before-talk-free (LBT-free), sharing the COT of the current FFP to perform the dynamic grant transmission, wherein the LBT-free means that the control signaling indicates that the first communication node is able to perform the dynamic grant transmission without performing the CCA.

16. The method of claim 15, further comprising:

while the first communication node is sharing the COT of the current FFP, determining whether to perform the CCA and the type of a performed CCA according to an interval between the dynamic grant transmission and previous transmission in the COT of the current FFP.

17. The method of claim 1, wherein determining, according to the detection result, the COT for the data transmission of the first communication node comprises:

either in response to the data transmission being dynamic grant transmission that satisfies a channel occupancy initiation condition, and the information sent by the second communication node comprising control signaling that is configured to schedule the dynamic grant transmission and indicate that a type of a CCA is LBT, performing, by the first communication node as an initiating device, CCA detection in an idle period of the current FFP to determine whether COT of the next FFP is used for the dynamic grant transmission of the first communication node, wherein the channel occupancy initiation condition comprises the following: a start point of the data transmission is aligned with a start point of an FFP of the first communication node, and an end point of the data transmission ends before an idle period of the FFP; or otherwise in response to the data transmission being dynamic grant transmission and the information sent by the second communication node comprising control signaling that is configured to schedule the dynamic grant transmission, determining, according to a 1-bit field added to the control signaling, COT used for the dynamic grant transmission.

18. A first communication node, comprising:

at least one processor; and a storage apparatus configured to store at least one program, wherein when the at least one program is executed by the at least one processor, the at least one processor performs:

in response to the first communication node performing no clear channel assessment (CCA) detection in an idle period of a previous fixed frame period (FFP), detecting information sent by a second communication node in channel occupancy time (COT) of a current FFP to obtain a detection result, wherein the COT of the current FFP is used by the second communication node to perform data transmission; and determining, according to the detection result, COT for data transmission of the first communication node;

wherein determining, according to the detection result, the COT for the data transmission of the first communication node comprises:

in response to the information sent by the second communication node comprising group control signaling that indicates that a remaining COT duration corresponds to a predefined row and the first communication node satisfying a channel occupancy initiation condition, performing CCA detection in an idle period of the current FFP and performing the data transmission of the first communication node in COT of a next FFP, wherein the predefined row comprises a row having a predefined row index or a row having a predefined information indication combination, and the second communication node serves as a responding device.

19. A non-transitory storage medium storing a computer program which, when executed by a processor, causes the processor to perform:

in response to a first communication node performing no clear channel assessment (CCA) detection in an idle period of a previous fixed frame period (FFP), detecting information sent by a second communication node in channel occupancy time (COT) of a current FFP to obtain a detection result, wherein the COT of the current FFP is used by the second communication node to perform data transmission; and determining, according to the detection result, COT for data transmission of the first communication node;

wherein determining, according to the detection result, the COT for the data transmission of the first communication node comprises:

in response to the information sent by the second communication node comprising group control signaling that indicates that a remaining COT duration corresponds to a predefined row and the first communication node satisfying a channel occupancy initiation condition, performing CCA detection in an idle period of the current FFP and performing the data transmission of the first communication node in COT of a next FFP, wherein the predefined row comprises a row having a predefined row index or a row having a predefined information indication combination, and the second communication node serves as a responding device.

20. The method of claim 4, wherein determining, according to the detection result, the COT for the data transmission of the first communication node comprises:

in response to detecting no group control signaling sent by the second communication node, not sharing the COT of the current FFP to perform the data transmission of the first communication node and performing no CCA detection in an idle period of the current FFP; and in response to the first communication node receiving the group control signaling for a first time, determining, according to information indicated by the group control signaling, the COT for the data transmission of the first communication node.

* * * * *